Jan. 26, 1965   R. A. BREITENGROSS, JR., ETAL   3,166,896
METHOD FOR SUPPRESSING ROCKET MOTOR EXHAUST FLAME
Filed Jan. 5, 1962                                   2 Sheets-Sheet 1

INVENTORS.
RICHARD A. BREITENGROSS, JR.
WILLIAM E. DONALDSON
BY
*O. H. Firsht*
ATTORNEY.

Jan. 26, 1965   R. A. BREITENGROSS, JR., ETAL   3,166,896
METHOD FOR SUPPRESSING ROCKET MOTOR EXHAUST FLAME
Filed Jan. 5, 1962                                   2 Sheets-Sheet 2

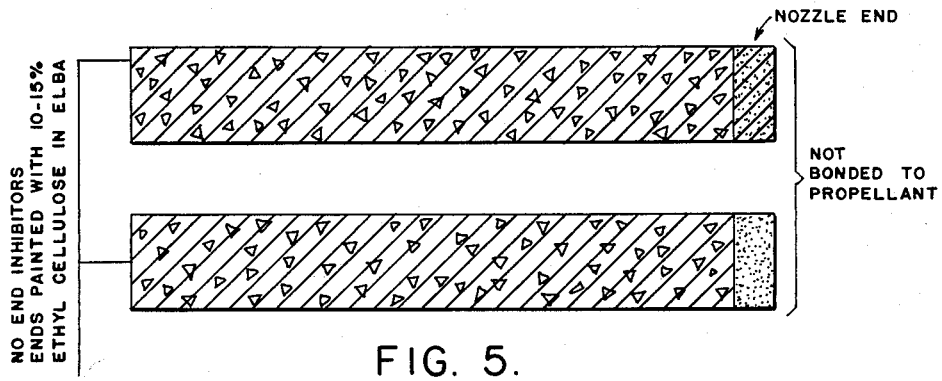

FIG. 5.

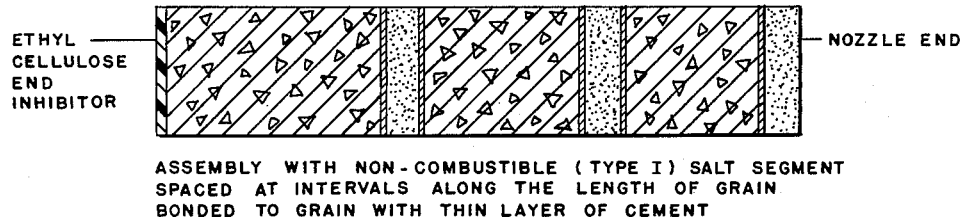

ASSEMBLY WITH NON-COMBUSTIBLE (TYPE I) SALT SEGMENT
SPACED AT INTERVALS ALONG THE LENGTH OF GRAIN
BONDED TO GRAIN WITH THIN LAYER OF CEMENT

FIG. 6.

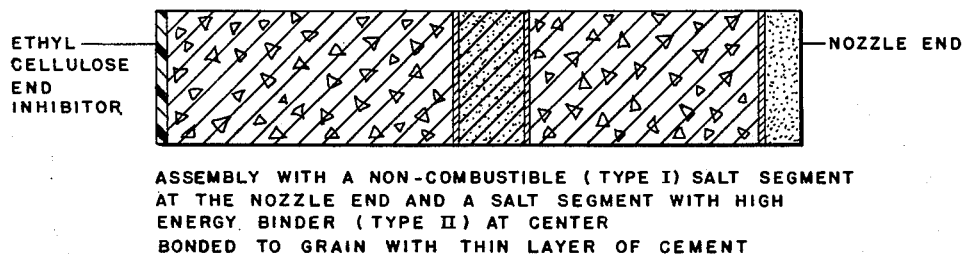

ASSEMBLY WITH A NON-COMBUSTIBLE (TYPE I) SALT SEGMENT
AT THE NOZZLE END AND A SALT SEGMENT WITH HIGH
ENERGY BINDER (TYPE II) AT CENTER
BONDED TO GRAIN WITH THIN LAYER OF CEMENT

FIG. 7.

KEY

 SALT SEGMENT TYPE I (NON-COMBUSTIBLE)

 SALT SEGMENT TYPE II (PROPELLANT)

INVENTORS.
RICHARD A. BREITENGROSS, JR.
WILLIAM E. DONALDSON
BY

ATTORNEY.

United States Patent Office 3,166,896
Patented Jan. 26, 1965

3,166,896
METHOD FOR SUPPRESSING ROCKET MOTOR EXHAUST FLAME
Richard A. Breitengross, Jr., and William E. Donaldson, China Lake, Calif., assignors to the United States of America as represented by the Secretary of the Navy
Filed Jan. 5, 1962, Ser. No. 165,067
8 Claims. (Cl. 60—35.6)
(Granted under Title 35, U.S. Code (1952), sec. 266)

The invention herein described may be manufactured and used by or for the Government of the United States of America for governmental purposes without the payment of any royalties thereon or therefor.

The present invention relates to a new and improved device and method for suppressing rocket motor exhaust flame.

Old methods for suppressing exhaust flame, not only from rocket motors but from other ordnance equipment such as small arms and artillery pieces, consist of mixing flame suppressing agents in the propellant formulation or mixing small amounts of black powder with smokeless powder charges. Small silk or cotton bags containing flame suppressors have been used to repress the flash and flame from the muzzles of big guns and artillery pieces. Chemical agents incorporated in a thermoplastic or thermosetting binder and applied as a coating to a metal rod with in the propellant grain are used in rocketry to inhibit resonant burning and to suppress the exhaust flames of the propellant during the launching phase as disclosed in copending patent application Serial No. 503,043, filed April 21, 1955, now Patent No. 3,068,643. Mechanical attachments to gun muzzles, or rocket nozzles, such as bars, rods, cones and so forth, have been used to break up or modify shock wave formation which is thought to cause re-ignition of fuel-rich exhaust gases. Coated rods tend to decrease in effectiveness as the size of the rocket motor is increased. Many sulfur-containing compounds, such as black powder, are incompatible with calendered or rolled double-base propellants. Bag methods and surface dusting are not practical in rocket motors because of difficulties in attaining reliability and reproducibility of results. It is the general purpose of this invention to provide a method and device for flame suppression which embraces all of the advantages of similarly employed methods and devices and avoids the aforementioned disadvantages. To attain this the present invention contemplates the introduction of flame suppressing ingredients into the exhaust gases of rocket nozzles by the use of new chemical compositions fabricated into novel forms.

It is therefore an object of the present invention to provide a method and device for suppressing rocket motor exhaust flame readily adaptable to different design rocket motors, i.e., liquid, solid, or hybrid.

Another object of this invention is to provide a flame suppressor device which will also act as an end-burning inhibitor replacement for a propellant grain.

A further object is to provide a device which will act as a temporary hot gas baffle and heat barrier for rockets.

Still another object is to provide a means for spin stabilization of a rocket motor.

Yet another object of the present invention is the provision of a chemical means which will provide additional rocket propulsive energy.

Another object is to provide a method for sacrificially cooling rocket motor nozzles.

Other objects, features and many of the attendant advantages of this invention will become readily appreciated as the same become better understood by reference to the following detailed description when considered in connection with the accompanying drawings in which like reference numerals designate like parts throughout the figures thereof.

FIG. 5 is a schematic showing of propellant grain assemblies and salt segments which are not bonded to the grain;

FIG. 6 is a schematic showing of a propellant grain assembly showing one chemical type of salt segment at spaced intervals along the grain; and FIG. 7 is a schematic assembly of a propellant grain showing two chemical types of salt segments along the grain.

Figure 1:
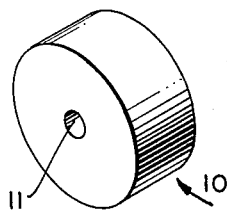
FIG. 1 shows a perspective view of one of the possible configurations of the invention.

The present invention comprises a chemical flame suppressing agent, or agents, incorporated with binder materials which are fabricated into forms or segments some of which may resemble short segments of a rocket motor solid propellant charge; these forms or segments being self-supported within a rocket motor chamber at a point or points where the segment or segments are eroded by the impinging gas stream from combustion of the propelling charge thereby carrying the flame suppressing chemicals into the rocket exhaust gases and suppressing the exhaust flame of a rocket throughout burning.

The formulations utilized in this invention have been arbitrarily designated Type I Salt Segment Formulations (Non-combustible) and Type II Salt Segment Formulations (Propellant). Their compositions are as follows:

*Type I, salt segment formulations (non-combustible)*

| A. Ingredients | Percent by weight | Function |
|---|---|---|
| Potassium sulfate | 70.0 | Flame suppressor. |
| Polyvinyl chloride resin | 16.05 | |
| Expoxidized Soybean Ester | 8.00 | Binder. |
| Dioctyl phthalate | 4.15 | |
| Diethyl phthalate | 1.50 | |
| Polyvinyl chloride resin | 0.30 | Stabilizer. |

This is the preferred non-combustible formulation. It gives excellent results with the longer burning type propellant grain.

| B. Ingredients | Percent by weight | Function |
|---|---|---|
| Potassium sulfate | 70 | Flame suppressor. |
| Ethyl cellulose | 14.65 | |
| N-butyl methacrylate | 9.00 | |
| N-butyl stearate | 5.00 | Binder. |
| Polyglycol dimethacrylate | 1.20 | |
| Benzoyl peroxide | .15 | |
| Red Oil Dye | .10 | (Added for color.) |

This formulation is disclosed in copending patent application Serial No. 503,043, filed April 21, 1955, now Patent No. 3,068,643, where it is supported in a double-base propellant grain by means of a rod. The same rod coating ingredients were mixed and fabricated by the present inventors into self-supporting segments or disks, but they eroded too rapidly, thereby decreasing the duration of their flame suppressing effect.

| C. Ingredients | Percent by weight | Function |
|---|---|---|
| Potassium sulfate | 80 | Flame suppressor. |
| Polyvinyl chloride plastisol | 20 | Binder. |

NOTE.—10 grams of expanded silicon dioxide were added as a filler.

This formulation was difficult to handle and to shape.

| D. Ingredients | Percent by weight | Function |
|---|---|---|
| Potassium sulfate | 70 | Flame suppressor. |
| Nylon molding pellets | 30 | Binder. |

This formulation requires a fairly high temperature to process and for that reason has not been given preference in testing.

| E. Ingredients | Percent by weight | Function |
|---|---|---|
| Potassium sulfate | 70 | Flame suppressor. |
| Polystyrene molding | 30 | Binder. |

This formulation can be molded and shaped and has tested out very well with long-burning type repellants.

| F. Ingredients | Percent by weight | Function |
|---|---|---|
| Potassium sulfate | 70 | Flame suppressor. |
| Polymethylmethacrylate | 30 | Binder. |

This formulation is brittle and was found to be difficult to bond to the propellant charge.

| G. Ingredients | Percent by weight | Function |
|---|---|---|
| Potassium sulfate | 70 | Flame suppressor. |
| Polyethylene molding pellets | 30 | Binder. |

This formulation is erosion resistant by fast burning propellant and would be more suitable for longer burning grains.

| H. Ingredients | Percent by weight | Function |
|---|---|---|
| Potassium sulfate | 80 | Flame suppressor. |
| Silicone gum solution in Xylene | 20 | Binder. |

This formulation is putty-like and the hot gases merely cause easy extrusion of this material.

In preparing the aforementioned formulations, the binder ingredients are blended together in a mixer and the flame suppressing salts are added in small increments during the mixing process until the total amount has been added and blended. After mixing, the material is cast or pressed into aluminum or other type molds to conform to the design of the rocket motor in which they are to be used. Upon cooling and removal from the molds, the materials may be sawed, trimmed, or machined to particular dimensions, as necessary.

The Type I segments are cured in an air-bath oven at 350° F.±10° F. for approximately one hour per inch of casting thickness.

*Type II, Salt Segment Formulations (propellant)*

| A. Ingredients | Percent by weight | Function |
|---|---|---|
| Potassium sulfate | 20.0 | Flame suppressor. |
| Potassium perchlorate | 30.0 | |
| Plastisol nitrocellulose | 14.0 | Binder. |
| Pentaerythritol trinitrate | 35.0 | |
| meta-Dihydroxybenzene | 1.0 | Stabilizer. |

The nitrocellulose used in this formulation is the plastisol type with 10µ average particle size.

| B. Ingredients | Percent by weight | Function |
|---|---|---|
| Potassium perchlorate | 30.00 | Flame suppressors. |
| Potassium sulfate | 20.00 | |
| Plastisol nitrocellulose | 18.47 | |
| Pentaerythritol trinitrate | 29.20 | Binder. |
| Triethylene glycol dinitrate | 1.33 | |
| Diethyldiphenylurea | 1.00 | Stabilizer. |

Segments made of this formulation suppressed exhaust flame completely.

| C. Ingredients | Percent by weight | Function |
|---|---|---|
| Potassium perchlorate | 25 | Flame suppressors. |
| Potassium sulfate | 25 | |
| Plastisol nitrocellulose | 15 | |
| Trimethylolethane trinitrate | 29 | Binder. |
| Triethyleneglycol dinitrate | 3 | |
| Manganese dioxide | 2 | Burning modifier. |
| meta-Dihydroxybenzene | 1 | Stabilizer. |

| D. Ingredients | Percent by weight | Function |
|---|---|---|
| Potassium sulfate | 55 | Flame suppressor. |
| Binder | 45 | |
| Plastisol nitrocellulose | 38 | |
| Pentaerythritol trinitrate | 39 | |
| Dibutyl phthalate | 20 | |
| Adiponitrile | 1 | |
| Diethyldiphenylurea | 2 | |

In test motors fired at 70° F., 1-inch segments suppressed exhaust flame completely for 30% of the 1.2 second burning time, while 3-inch segments were effective for 80% of the burning time.

| E. Ingredients | Percent by weight | Function |
|---|---|---|
| Potassium sulfate | 20 | Flame suppressors. |
| Potassium perchlorate | 30 | |
| Plastisol nitrocellulose | 15 | |
| Petrin | 32 | Binder. |
| Triacetin | 3 | |
| meta-Dihydroxybenzene | 2 | Stabilizer. |

| F. Ingredients | Percent by weight | Function |
|---|---|---|
| Potassium sulfate | 40 | Flame suppressor. |
| Plastisol nitrocellulose | 38 | Binder. |
| Pentaerythritol trinitrate | 60 | |
| Diethyldiphenylurea | 2 | Stabilizer. |

The Type II formulations are mixed in the same manner as described under Type I formulations, the binder ingredients being blended together in a mixer and the flame suppressing salts being added in small increments during the mixing process until the total amount has been added and blended. After mixing the ingredients may be molded or fabricated into various novel forms consistent with their proposed use.

Type II segments must be handled with explosives processing equipment due to the hazardous nature of the ingredients. Type II segments are cured in an air-bath oven at 180°±10° F. for approximately one hour per inch of casting thickness. The Type II formulations used, in this invention burn rapidly like the propellant with which they are used, thereby resulting in improved, more uniform and complete erosion of the segment as well as the realization of some added propulsive energy from the segment. These flame suppression segment formulations generally should be tailored to the burning rate of the propellant grain with which they are to be used so that erosion of the salt is complete at propellant burnout.

In both Type I and II formulations other flame suppressor agents which may be used include potassium chloride, potassium tartrate, potassium dihydrogen phosphate, potassium nitrate and anthracene.

Other binder materials may be used with success as their importance lies in the erosion characteristics as they respond to the environmental conditions of various types rocket motors.

Figure 2:
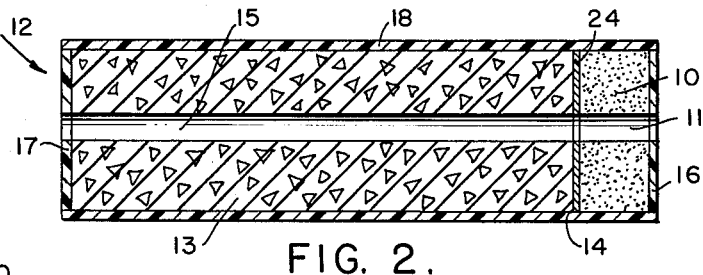
FIG. 2 is a longitudinal sectional view of a perforated propellant grain incorporating a cast salt segment of the invention as shown in FIG. 1.

Referring now to FIG. 1, there is shown a salt segment 10, having a single perforation 11 and composed of any one of the several flame suppressing compositions described herein. In FIG. 2 there is shown a solid rocket propellant grain assembly, designated generally by numeral 12 comprising a single perforated grain 13 to which salt segment 10, shown in FIG. 1, is bonded at point 14 with a cement 24; salt segment perforation 11 being in coaxial alignment with grain perforation 15. Secured to each end of grain assembly 12 are disk shaped, single perforated end-burning inhibitors 16 and 17, consisting essentially of ethyl cellulose. Assembly 12 is completely wrapped with ethyl cellulose tape, designated generally by numeral 18.

Figure 3:
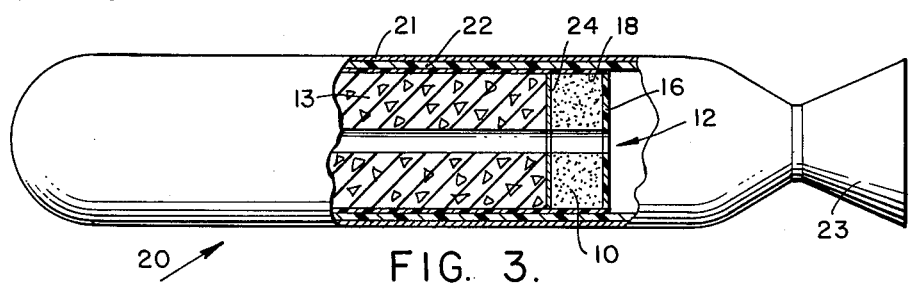
FIG. 3 is a partial schematic showing of an assembly of the propellant grain and segment in a rocket motor.
Figure 4:
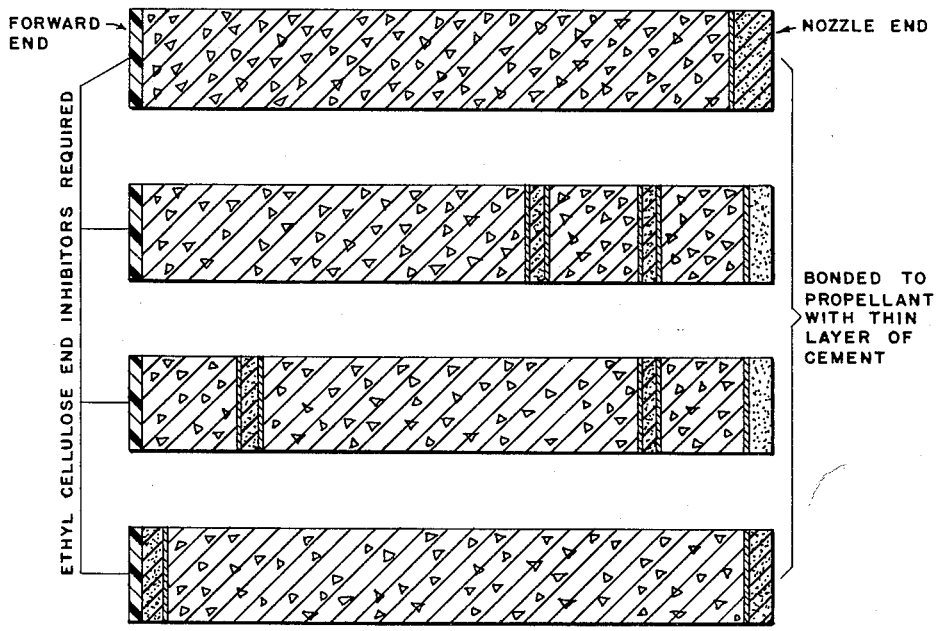
FIG. 4 is a schematic showing of propellant grain assemblies showing various areas where the salt segments may be bonded to the grain.

The manner of assembling the salt segment 10 and grain 13 in a rocket motor, designated generally by numeral 20, is shown in FIG. 3. Motor 20 is generally shown having a metal casing 21, a plastic liner 22 and a single nozzle 23.

The segments or disks may be cemented to the grain billet using any satisfactory bonding agent which is compatible with both segment and propellant ingredients. Propellant and salt assemblies made for experimental test firings have been satisfactorily attached with a cement or adhesive made by dissolving 10 to 15% by weight of ethyl cellulose in a solvent composed of one volume of ethyl lactate and two volumes of butyl acetate.

It has been found that it is unnecessary to secure Type I non-combustible salt segments to the propellant charge. For example, the propellant charge may be coated with ethyl cellulose lacquer as a precaution against flash-through and the Type I salt segment loaded separately acting as an end inhibitor for the propellant charge.

In securing a segment of the present invention to a propellant grain, it was discovered that when the segment was twisted slightly out of alignment with the grain perforation, a spinning moment about the longitudinal axis was imparted to the rocket during static firing.

In order to better understand how this invention is an improvement over other known flame suppressing devices, the operation of the present invention will be briefly described. As a propellant grain burns in a rocket motor, a high-velocity, high-temperature gaseous envelope is formed behind the motor. This envelope contains a mixture of gaseous products capable of further combustion. These gases are subject to ignition from various sources such as shock wave compression, glowing particles of carbon, or hot metal surfaces and particles eroded from the nozzle or the motor case. The present invention adds chemical flame suppressing agents to the mixture of combustible propellant gases to prevent combustion or reignition from taking place in the exhaust of rocket motors. Gases escaping from the burning solid propellant grain must pass over the surface of the sale segment thereby ablating this surface and carrying the flame suppressor chemicals into the exhaust stream.

Furthermore, when the salt segment is positioned especially at the nozzle end of a propellant grain to prevent reignition of the exhaust gases, it also acts as a sacrificial nozzle cooling device. The hot gases from the propellant grain impinge on the salt segment ablating the salt surface thereby dissipating heat in the erosion process. This process inherently provides a cooling effect which is important to the protection of the nozzle components.

Segments or plugs of both Type I and Type II formulations have been located at spaced intervals along the length of the propellant grain in addition to the location adjacent to the rocket motor nozzle. As shown schematically in FIGS. 4, 5, 6 and 7, the number of segments, their composition and their location along the grain have wide variation.

The Type I formulations have also been cast or pressed in place in nozzle cavities where the salt could be eroded out by the impinging gas stream from combustion of the propelling charge thereby both cooling the nozzle and preventing reignition of the exhaust gases.

Obviously many modifications and variations of the present invention are possible in the light of the above teachings. It is therefore to be understood that within the scope of the appended claims the invention may be practiced otherwise than as specifically described.

What is claimed it:

1. A jet actuated device comprising in combination, a rocket motor having at least one exit nozzle, a propellant grain within said motor and a flame suppressing disk bonded to the nozzle end of said grain, said disk consisting essentially of potassium sulfate, potassium perchlorate, nitrocellulose, pentaerythritol trinitrate and meta-Dihydroxybenzene.

2. A jet actuated device comprising in combination, a rocket motor having at least one exit nozzle, a propellant grain within said motor and a flame suppressing disk bonded to the nozzle end of said grain; said disk consisting essentially of 20 percent by weight potassium sulfate, 30 percent by weight potassium perchlorate, 14 percent by weight nitrocellulose, 35 percent by weight pentaerythritol and 1 percent by weight meta-Dihydroxybenzene.

3. A jet actuated device comprising in combination, a rocket motor having a combination chamber and at least one exit nozzle, a propellant grain within said chamber and two flame suppression devices in the form of short propellant grain segments, the first of said devices consisting essentially of 70 percent by weight potassium sulfate, 16.05 percent by weight polyvinyl chloride resin, 8 percent by weight epoxidized soybean ester, 4.15 percent by weight dioctyl phthalate, 1.5 percent by weight diethylphthalate and .30 percent polyvinyl chloride stabilizer and being bonded to the nozzle end of said propellant grain; the second device comprising 20 percent by weight potassium sulfate, 30 percent by weight potassium perchlorate, 14 percent by weight nitrocellulose, 35 percent by weight pentaerythritol trinitrate and 1 percent meta-Dihydroxybenzene, being bonded to the central portion of said grain.

4. A jet actuated device comprising in combination, a rocket motor having at least one exit nozzle, a propellant grain within said motor, and a flame suppressing segment molded in the form of a thin perforated disk and secured to the nozzle end of said grain, said segment consisting essentially of 55 percent by weight potassium sulfate and 45 percent by weight binder composed essentially of 38 percent nitrocellulose, 39 percent pentaerythritol trinitrate, 20 percent dibutyl phthalate, 1 percent adiponitrile and 2 percent diethyldiphenylurea.

5. A method for preventing reignition of rocket motor exhaust gases comprising providing a flame suppressor element in the form of a perforated segment consisting essentially of potassium sulfate, polyvinyl chloride resin, epoxidized soybean ester, dioctyl phthalate, diethyl phthalate and polyvinyl chloride stabilizer; bonding said element to the nozzle end of a propellant grain with an adhesive material consisting essentially of 10 to 15 percent by weight ethyl cellulose dissolved in a solvent composed of one volume of ethyl lactate and two volumes of butyl acetate.

6. A method for preventing reignition of rocket exhaust gases which is inherently a sacrificial cooling method for rocket nozzle components comprising, providing a material consisting essentially of potassium sulfate and polyethylene, casting said material into rocket nozzle cavities, causing the gas stream from combustion of the propellant to impinge upon and erode said material, and carrying said eroded material into the rocket exhaust.

7. A method for preventing reignition of rocket exhaust gases comprising providing a plurality of flame suppression devices in the form of disks, and securing said devices at spaced intervals along the length of a propellant grain with a cement consisting essentially of 10 to 15 percent ethyl cellulose dissolved in a solvent composed of one volume of ethyl lactate and two volumes of butyl acetate.

8. A method for preventing reignition of rocket exhaust gases which is inherently a sacrificial cooling method for rocket nozzle components comprising providing a flame suppressing element in the form of a short perforated propellant grain segment consisting essentially of potassium sulfate and polyethylene, and securing said element to the nozzle end of a propellant grain with an adhesive compatible both with the grain and element compositions.

References Cited by the Examiner

UNITED STATES PATENTS

| 2,050,871 | 8/36 | Woodbridge | 102—98 |
| 2,444,957 | 7/48 | Skinner | 60—35.6 |
| 2,990,684 | 7/61 | Cohen | 60—35.6 |

FOREIGN PATENTS

| 16,777 | 7/97 | Great Britain. |
| 29,292 | 12/09 | Great Britain. |
| 424,784 | 2/35 | Great Britain. |

SAMUEL LEVINE, *Primary Examiner.*

SAMUEL FEINBERG, *Examiner.*